United States Patent
Long et al.

(10) Patent No.: US 8,118,525 B2
(45) Date of Patent: Feb. 21, 2012

(54) CARGO BAR

(75) Inventors: Wang Xiao Long, Englewood Cliffs, NJ (US); Anthony Da Silva, Marlboro, NJ (US)

(73) Assignee: Asian Industrial Products, Inc., Fort Lee, NJ (US)

( * ) Notice: Subject to any disclaimer, the term of this patent is extended or adjusted under 35 U.S.C. 154(b) by 0 days.

(21) Appl. No.: 12/550,009

(22) Filed: Aug. 28, 2009

(65) Prior Publication Data

US 2010/0260571 A1    Oct. 14, 2010

Related U.S. Application Data

(60) Provisional application No. 61/151,486, filed on Feb. 10, 2009.

(51) Int. Cl.
    *B61D 45/00*    (2006.01)
(52) U.S. Cl. ........................................................ 410/151
(58) Field of Classification Search .................. 410/151, 410/143, 145, 149, 153; 248/354.7
See application file for complete search history.

(56) References Cited

U.S. PATENT DOCUMENTS

| | | |
|---|---|---|
| 838,911 A | 12/1906 | Seacrist |
| 3,049,328 A | 8/1962 | Bishop |
| 3,583,743 A | 6/1971 | Newell |
| 4,083,530 A | 4/1978 | Linnepe |
| 4,434,970 A | 3/1984 | Boland et al. |
| 4,669,934 A | 6/1987 | Wisecarver |
| 5,094,576 A | 3/1992 | Fredelius |
| 5,443,342 A | 8/1995 | Huang |
| 5,769,293 A * | 6/1998 | Zaretsky .................... 224/551 |
| 5,833,414 A | 11/1998 | Feldman et al. |
| 5,890,856 A | 4/1999 | Huang |
| 5,947,666 A * | 9/1999 | Huang ........................ 410/151 |
| 5,988,963 A | 11/1999 | Shiau |
| 6,062,782 A | 5/2000 | Huang |
| 6,186,715 B1 | 2/2001 | Oliviero |
| 6,247,882 B1 | 6/2001 | Huang |
| 6,368,037 B1 * | 4/2002 | Oliviero et al. ............ 410/151 |
| 6,371,422 B1 | 4/2002 | St. Martin et al. |
| 6,698,984 B1 | 3/2004 | Chen |
| 6,736,371 B1 | 5/2004 | Burrows |
| 6,755,600 B2 * | 6/2004 | Scott ........................... 410/151 |
| 7,311,294 B1 | 12/2007 | Ruan |
| 7,331,567 B2 | 2/2008 | Li |
| 7,334,973 B2 | 2/2008 | Scott |

(Continued)

FOREIGN PATENT DOCUMENTS

EP    0404745    12/1990

*Primary Examiner* — Glenn Dayoan
*Assistant Examiner* — Sunsurraye Westbrook
(74) *Attorney, Agent, or Firm* — Ostrager Chong Flaherty & Broitman PC

(57) ABSTRACT

The present disclosure provides a cargo bar having high load strength. The cargo bar generally comprises an outer sheath and an inner cylindrical telescoping portion. The telescoping portion has a ribbed section with ribs formed from the walls of the telescoping portion. Fastened to the outer sheath is a handle mechanism comprising a handle frame and a lever, the lever having teeth for gripping the ribs of the inner telescoping portion. The handle may be moved from an open position to a closed position, thereby extending the inner portion away from the outer portion through the interaction of the teeth with the ribs of the inner bar. Increased strength is provided by the ribs formed from the walls of the telescoping portion.

19 Claims, 12 Drawing Sheets

U.S. PATENT DOCUMENTS

| | | |
|---|---|---|
| 7,374,380 B2 | 5/2008 | Huang |
| 7,389,970 B2 | 6/2008 | Ruan |
| 2006/0051179 A1* | 3/2006 | Scott .......................... 410/151 |
| 2008/0025809 A1 | 1/2008 | Ruan |
| 2008/0210915 A1 | 9/2008 | Ruan |

* cited by examiner

CARGO BAR

CROSS-REFERENCE TO RELATED APPLICATION

This application is a non-provisional claiming priority from pending provisional application Ser. No. 61/151,486 filed Feb. 10, 2009, the specification of which is incorporated by reference herein.

TECHNICAL FIELD

This invention relates to a cargo bar that can be used in airplanes, trucks, trains and other appropriate areas. More specifically, this invention relates to an improved cargo bar having a sturdy locking feature.

BACKGROUND

Cargo bars are well known as a means of supporting cargo in transportation systems. Generally they comprise inner and outer telescoping tubes which can be extended against walls of an interior of a cargo compartment such as those found in a truck or airplane. However, prior cargo bars had a low maximum weight tolerance due to weak or insecure focal points.

The following exemplary cargo bars are illustrative of what is known in the art: a first prior art device, depicted in FIG. 17 and described in U.S. Pat. No. 5,833,414 to Feldman; a second prior art device, depicted in FIG. 18 and described in U.S. Pat. No. 5,947,666 to Huang; and a third prior art device, depicted in FIG. 19 and described in U.S. Patent Application Publication Number 2008/0210915 to Ruan.

The prior art cargo bar device depicted in FIG. 17 (Feldman) generally comprises inner and outer tubular members, and a gear rack. The gear rack is attached to the inner and outer tubular members. A housing surrounding the inner and outer tubular members has a lever for extending the inner tubular member from the outer tubular member. This extension is accomplished by pivoting the lever, which rotates a gear whose teeth are connected to the lever, the gear thereby being forced against the teeth of the gear rack, moving the inner tubular member. Once the bar is fully extended, the lever may lock into place, allowing the bar to be secured in place against two walls. One disadvantage to this system is that the cargo bar's securing function is only as strong as its weakest point. As the gear rack is attached at a small number of points to the cargo bar, this creates a point of weakness, since the attachment points between the cargo bar and the gear rack must bear the entire weight load of the cargo bar.

The prior art cargo bar device depicted in FIG. 18 (Huang) also generally comprises outer and inner tubular members, the inner tubular member being slidably inserted within the outer tubular member. A housing with a lever having a gear surrounds the inner and outer tubular members. The inner tubular member has notches for interacting with the teeth of the gear. This allows the bar to be extended in a similar fashion as the Feldman device. However, in comparison to the Feldman patent, this device suffers from a different but related problem of not having a strong point of attachment between the gear and the surface upon which the gear teeth are acting.

The prior art cargo bar device depicted in FIG. 19 (Ruan) is similar to the previously described bars, comprising an inner and outer tubular casing, the inner tubular casing having angled ridges, and a handle with teeth for engaging the inner tubular casing. However, the Ruan device moves the inner bar utilizing a minimal number of teeth. This creates a weak point, as the minimal number of teeth must bear the entire weight of the cargo bar load.

Therefore, it is an object of this application to provide a high weight tolerance cargo bar. It is a further object of this application to provide a cargo bar having easy fastening and extending features. It is a further object of this application to provide a cargo bar having a secure extension feature.

SUMMARY

In the present invention, these purposes, as well as others which will become apparent, are achieved generally by providing an apparatus and related method as described below. One such apparatus is a cargo bar with increased strength over previous cargo bars. The present cargo bar generally comprises an outer sheath and an inner cylindrical telescoping portion. The telescoping portion has a ribbed section with ribs formed from the walls of the telescoping portion. Fastened to the outer sheath is a handle mechanism comprising a handle frame and a lever, the lever having teeth for gripping the ribs of the inner telescoping portion. The handle may be moved from an open position to a closed position, thereby extending the inner portion away from the outer portion through the interaction of the teeth with the ribs of the inner bar.

In a preferred embodiment of the invention, an extendable cargo bar for securing cargo is provided, comprising: an outer tubular casing having a handle end and a foot end, the foot end of the outer tubular casing and the inner ribbed bar defining holes extending radially through the casing; an inner ribbed bar, having a handle end and a foot end, the cylindrical wall of the inner ribbed bar forming spaced annular ribs; a handle mechanism coupled to the outer tubular casing having a lever for operating the bar, the lever having teeth for engaging with the ribs of the inner ribbed bar, and configured to force the inner bar outwards upon closing of the lever and inwards upon opening of the lever, the handle mechanism comprising a handle frame having a hollow enveloping portion for enveloping the outer tubular casing, and two opposing sidewalls defining at least one bolt hole; a handle mechanism attachment bolt having horizontal threads for coupling the handle mechanism to the outer tubular casing, the attachment bolt being disposed through holes defined by the handle mechanism, the horizontal threads of the handle mechanism attachment bolt being tightened against the handle end of the outer tubular casing, thereby coupling the handle mechanism to the outer tubular casing; and one or more feet attached to the foot end of the outer tubular casing or the inner ribbed bar, for gripping cargo transportation walls.

A method of operating the cargo bar is also provided, comprising: providing a cargo bar having two ends with feet, an outer tubular casing, an inner ribbed bar with ribs formed from the cylindrical wall of the inner ribbed bar, and a handle coupled to the outer tubular casing, said handle having a lever with multiple teeth for gripping the ribs of the ribbed bar, said lever being movable between a closed position and an open position; placing the cargo bar between two support surfaces; and extending the cargo bar by closing the lever such that the feet grip the support surfaces.

BRIEF DESCRIPTION OF THE DRAWINGS

Other objects, features and advantages of the present invention will be apparent when the detailed description of the preferred embodiments of the invention are considered in conjunction with the drawings which should be construed in an illustrative and not limiting sense, as follows.

DETAILED DESCRIPTION OF THE PREFERRED EMBODIMENTS

Figure 1:
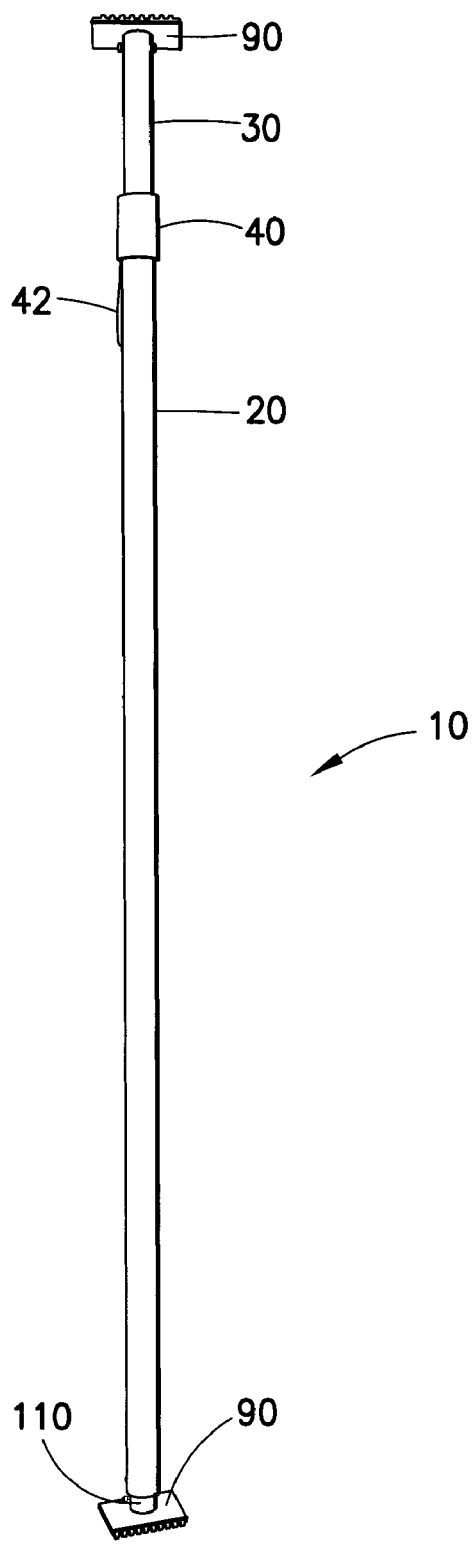
FIG. 1 shows a first preferred embodiment of a cargo bar.

As can be seen in FIG. 1, the Cargo Bar 10 generally comprises a hollow cylindrical outer tubular casing 20 which telescopically houses a movable ribbed bar 30. A handle mechanism 40 is provided which coacts with the movable ribbed bar 30 to provide install and release functions by extending and contracting the bar. The handle mechanism 40 surrounds handle attachment ends 24, 33 of the movable ribbed bar 30 and the outer tubular casing 20, and is fastened to the outer tubular casing 20, thereby joining the ribbed bar 30 and tubular casing 20 together.

The outer tubular casing 20 may vary in length, depending on intended use of the bar. In a standard commercial use embodiment, the outer tubular casing 20 is approximately 63" in length. Preferably, the movable ribbed bar 30 measures 28.5" in length, has a diameter of approximately 1 5/16" and is hollow, the cylindrical wall measuring 1/8" in thickness. The movable ribbed bar 30 includes spaced notches or ribs 34 which are set approximately 3/16" apart from each other. The ribs 34 preferably have a height of approximately 1/8".

A preferred length for the entire bar 10, with an optional foot extension 110, is between 80" and 115" such that the bar 10 may be installed in a standard freight compartment both horizontally and vertically, thereby serving a dual purpose. The bar 10 may also shrink to 66" to save space and expense in shipping. The movable ribbed bar 30 is preferably steel cast and rolled to form ribs 34. The handle lever 42 is preferably stamped drop forged. The handle frame 44 is preferably extruded. The bar 10 may be made of any material which allows it to be strong enough to provide a cargo retention function. Preferably it is made out of steel. The bar 10 may come in commercial and consumer forms, with the consumer form being lighter and smaller and for use in consumer trucks or the like. The commercial version may be larger and stronger. While several preferred methods of manufacturing the parts of the cargo bar 10 have been listed, any appropriate manufacturing process which gives the cargo bar and its parts the required strength may be used.

Figure 10:
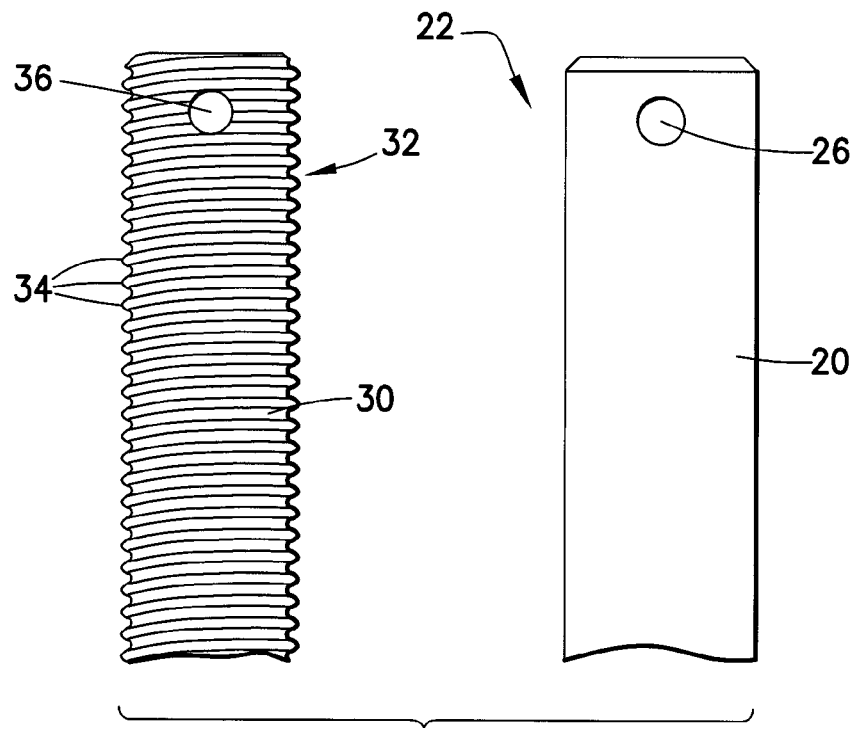
FIG. 10 shows the foot ends of a ribbed inner tube and an outer tubular casing with holes for affixing a cargo bar foot.

Both the outer tubular casing 20 and movable rived bar 30 both have foot ends 22, 32 for the attachment of feet 90, which serve to grip the walls of a cargo compartment. Preferably, as shown in FIG. 10, foot attachment holes 26, 36 provide space for a bolt for retaining the feet to the cargo bar. The foot attachment holes are preferably spaced preferably approximately 5/16" from the foot end 22 of each bar 20, 30 and are preferably approximately 3/8" in diameter. Bolts are the preferred method of affixing the feet to the cargo bar, and are passed through the feet and through the foot attachment holes, however other methods of attachment may be used.

Figure 9:
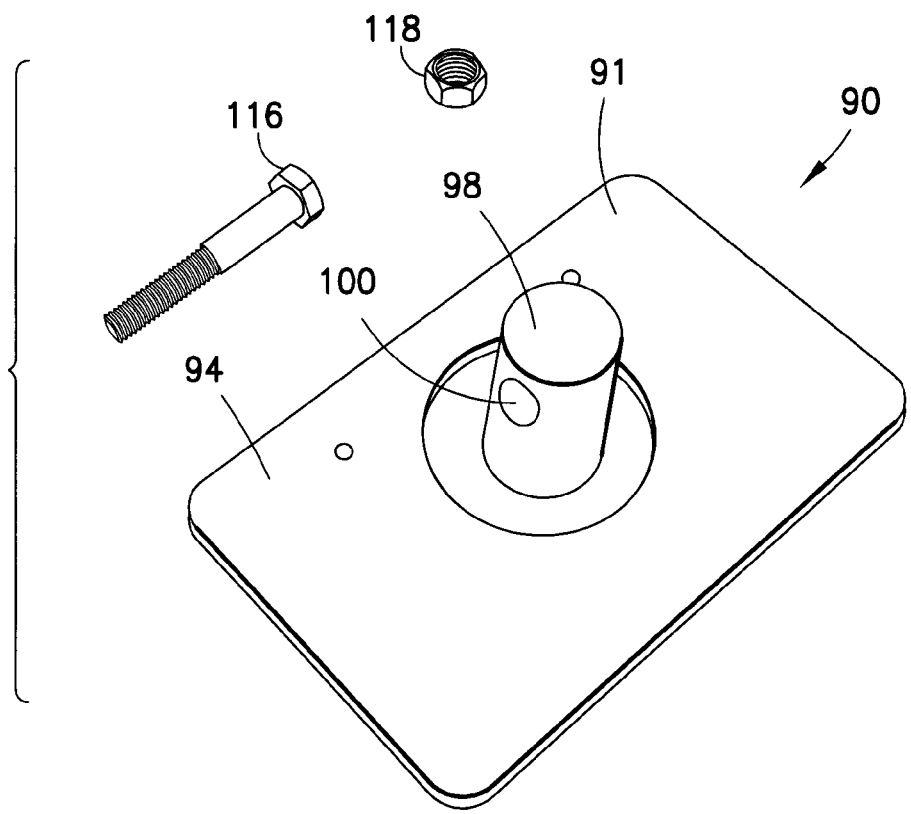
FIG. 9 is a perspective view a cargo bar foot.

Referring now to FIGS. 1 and 9, the cargo bar 10 preferably has feet 90 attached to the foot ends 22, 32 of the bar 10, allowing the bar 10 to grip the surfaces of a cargo area. Preferably, the feet 90 are made of a plastic material, and are thick enough to withstand any load the bar requires. The feet 90 preferably have a foot body 91 with a fastening side 94 and a gripping side 92, the gripping side 92 having a matrix of square protrusions 96 which increases the effectiveness of the gripping strength of the feet 90. Preferably, the foot is rectangular and preferably measures approximately 2.5" in width by 4" in length by 5/16" in depth. The square protrusions preferably measure approximately 1/4" in length by 1/4" in width by 3/16" in height. In one preferred embodiment, there are 40 protrusions laid out in a 5×8 grid. Any other structure which provides the needed gripping strength may be located at the gripping side 92 of the feet 90.

The feet 90 preferably have fastening extensions 98 extending from the fastening side 94, each fastening extension 98 defining bolt holes 100 for fastening to the bar 100. To fasten the feet 90 to the bar 10, as shown in FIG. 1, the fastening extension of the foot is placed within the foot end of either the outer tubular casing 20 or the movable ribbed bar 30. The bolt hole 100 on the foot fastening extension 98 is aligned with the foot attachment holes 26, 36 on the outer or inner bar 20, 30, and a bolt 116 is fastened with a nut 118 through the holes. Other methods of fastening the feet to the bar 10 are possible, such as spring-loaded rounded nubs.

Figure 7:
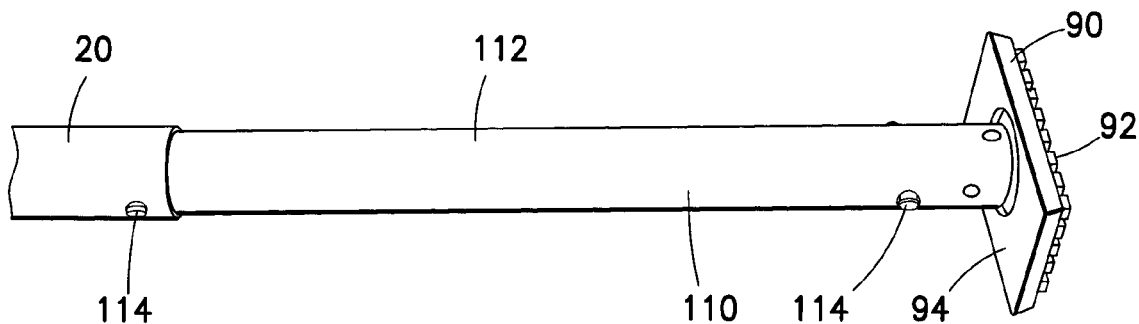
FIG. 7 shows a foot extension attached to a preferred embodiment of a cargo bar, in an extended position.

Optionally, as shown in FIG. 7, a foot extension 110 may be provided to extend the length of the bar 10. The extension 110 comprises a foot body 91, and a long fastening extension 112 with one or more securing structures for attachment to the bar 10. The securing structures are preferably retractable nubs 114 which can slide into holes on the inner ribbed bar 30 and outer tubular casing 20.

Figure 2:
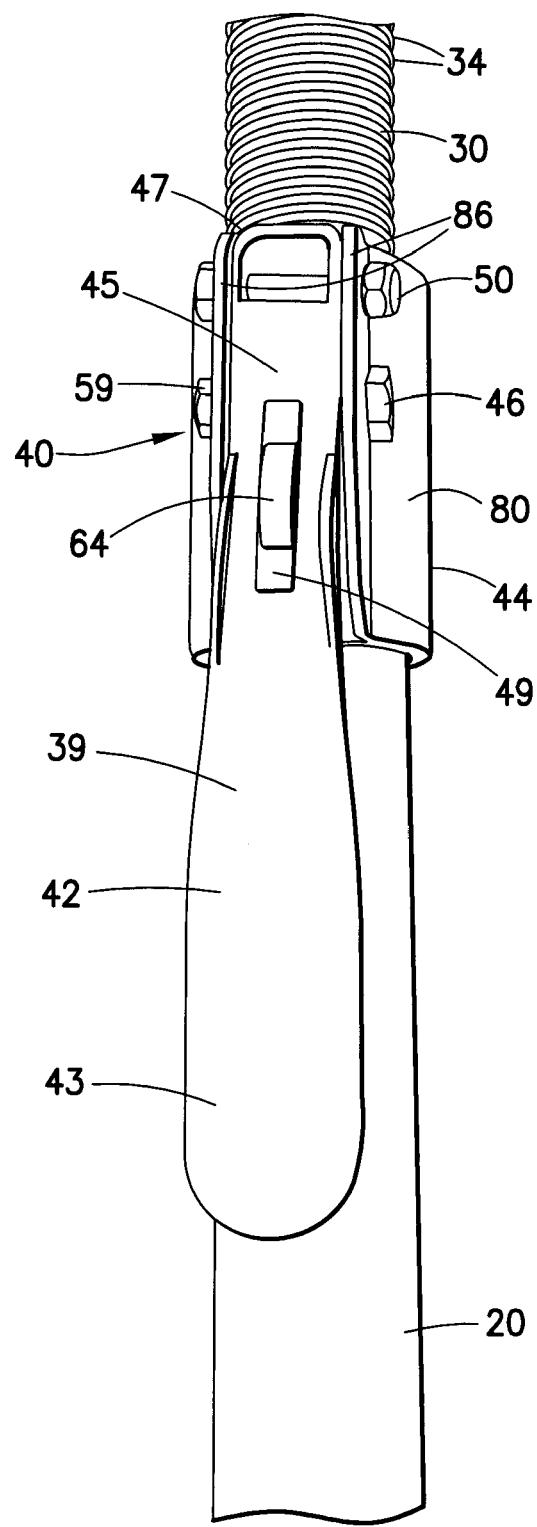
FIG. 2 is a close-up view of a first preferred embodiment of a cargo bar handle in closed position.
Figure 3:
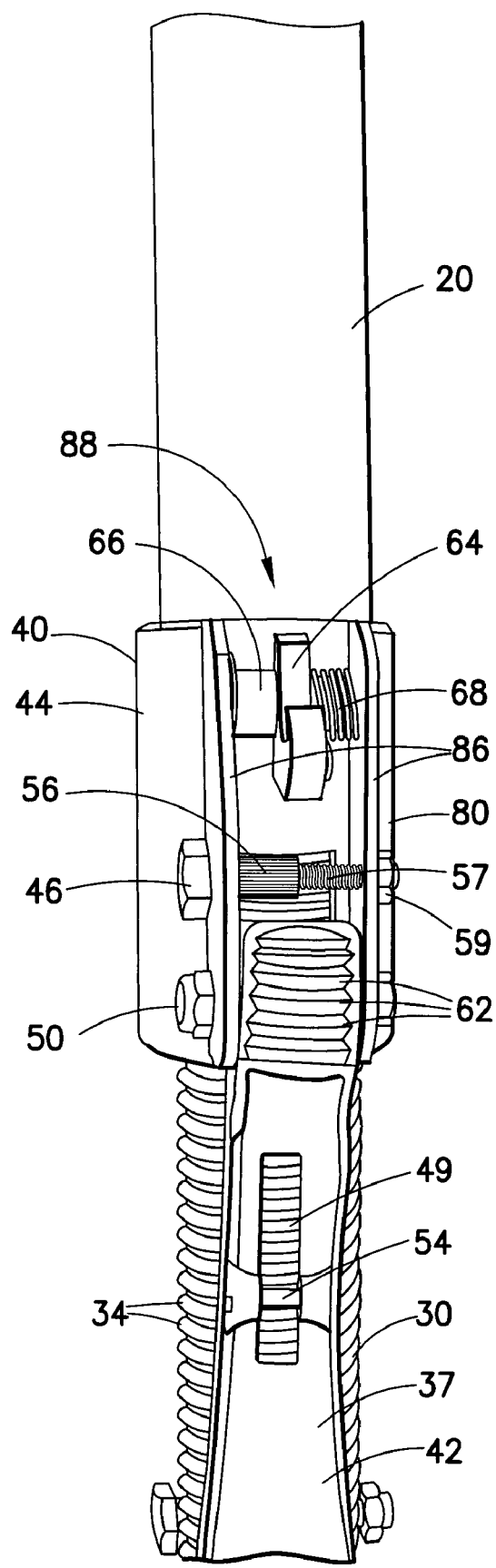
FIG. 3 is a close-up view of a first embodiment of a cargo bar handle in an open position.
Figure 4:
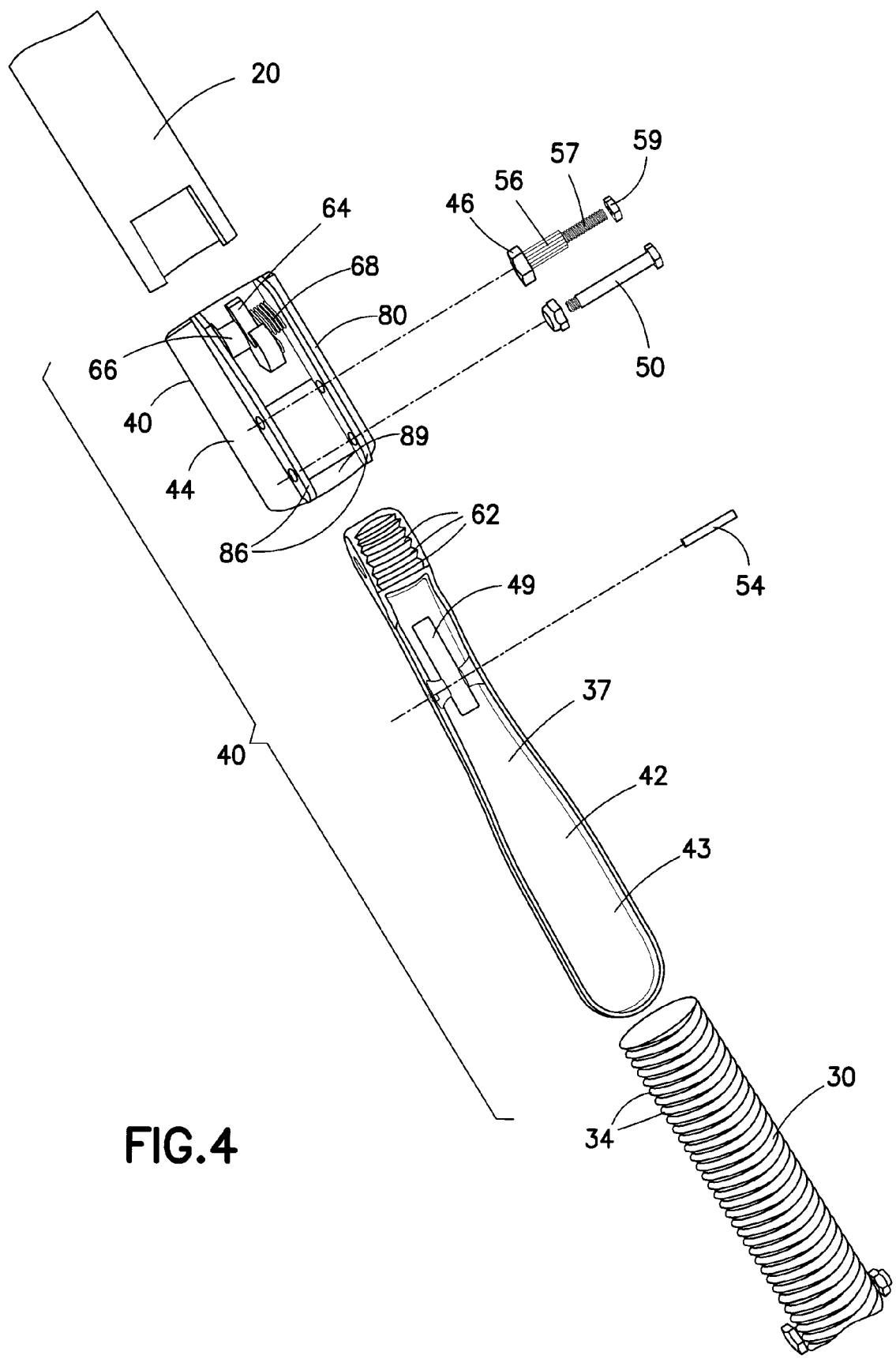
FIG. 4 is an exploded view of the handle mechanism, outer tubular casing and inner ribbed bar.

Referring now to FIG. 2-4, the handle mechanism 40 generally comprises a handle frame 44, and a gripping lever 42, the lever 42 having teeth 62 for engaging the ribbed bar 30. The handle mechanism 40 is preferably stamp drop forged. The handle frame 44 preferably comprises a hollow cylindrical enveloping portion 80 with an outer tubular casing end 82 and a movable ribbed bar end 84, and two parallel opposing sidewalls 86 projecting upwards from the hollow cylindrical enveloping portion 80, said opposing sidewalls together defining a handle components compartment 88.

Figure 13:
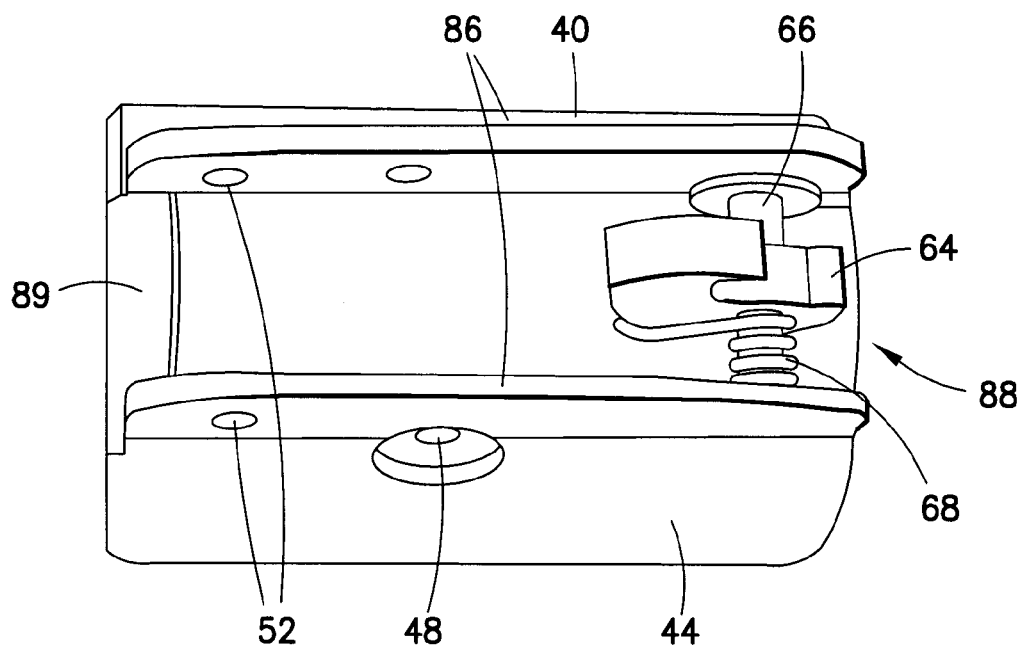
FIG. 13 is a side elevational view of a handle mechanism.

The hollow cylindrical enveloping portion 80, which is preferably roughly 3" in length, and has an outer diameter of approximately 2", is preferably designed to snugly fit both the movable ribbed bar 30 and the outer tubular casing 20. This requires that the enveloping portion 80 have one end with a smaller diameter than the other. As can be seen in FIG. 13, this is preferably accomplished with the inclusion of an increased thickness ring of material 89 at the end of the enveloping portion 80 which receives the movable ribbed bar 30 (at the movable ribbed bar end 84). This increased thickness ring 89 narrows the diameter of the enveloping portion 80 down to smaller than the diameter at the other end, such that the inner ribbed bar 30 may snugly fit into the enveloping portion 80. Preferably, this narrowed diameter is approximately 1⅜" while the diameter at the wider end is approximately 1 9/16". The increased thickness ring 89 also prevents the outer tubular casing from sliding fully through the movable ribbed bar end 84 of the handle mechanism 40, and also provides a secure resting point for the outer tubular casing.

The handle components compartment 88 measures approximately 13/16" in width and 3" in length. Within the handle components compartment 88 are parts necessary for the operation of the handle mechanism 40, including a spring loaded handle locking hook 64, a handle mechanism securing bolt 46 and a lever axle 50.

Figure 14:
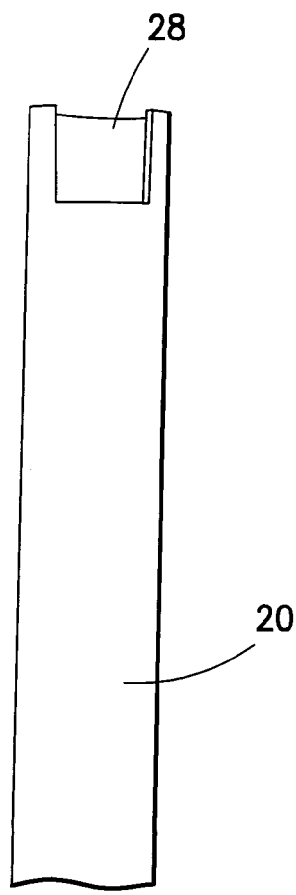
FIG. 14 is a top down view of the handle mechanism end of an outer tubular casing, showing a rectangular cutout for receiving the teeth of a lever.

Preferably, each sidewall 86 of the handle mechanism 40 has a lever axle hole 52 for receiving a lever axle 50 and a handle mechanism securing bolt hole 48 for receiving a handle mechanism securing bolt 46. Preferably the lever axle hole 52 is near the movable ribbed bar end 84, so that a gripping lever 42 can be attached to and pivot from that point. The gripping lever 42 is preferably rotatably attached to and extending from the lever axle 50, which is affixed through the lever axle hole 52. This allows teeth 62 on the gripping lever 42 to contact the movable ribbed bar 30. As can be seen in FIG. 14, to further facilitate contact between the teeth 62 and the ribs 34 of the movable ribbed bar 30, a rectangular cut-out section 28 is preferably present at the handle attachment end 24 of the outer tubular casing 20. The rectangular cut-out 28 preferably measures approximately 1" by 1", and allows the teeth 62 of the handle 42 to contact the ribs 34 of the ribbed bar 30 while also allowing the outer tubular casing 20 to sit up against the increased diameter ring of material 89 of the enveloping portion 80 of the handle frame 44.

Preferably, a handle mechanism securing bolt hole 48 is approximately in the center of the handle components compartment 88 and is preferably vertically positioned such that a handle mechanism securing bolt 46 may contact the outer tubular casing 20 when the outer tubular casing 20 is inserted into the handle mechanism 40. For this to be accomplished, the handle mechanism securing bolt hole 48 must be positioned towards the bottom of the handle components compartment 88. A handle mechanism securing bolt 46 is disposed through the holes 48 in the handle mechanism. Due to the positioning of the hole 48, the edge of the cut out 28 of the outer tubular casing 20 will lie roughly in the center of the enveloping portion 80, and will be roughly in contact with the handle mechanism securing bolt 46.

This handle mechanism securing bolt 46 has horizontal threads 58 on a horizontal thread section 56, which function to grip the outer tubular casing 20. The handle mechanism securing bolt 46 also preferably has a standard threaded section 57 for securing the handle mechanism securing bolt 46 to the handle mechanism 40 with a nut 59. The horizontal threaded section 58 of the handle mechanism securing bolt 46 is preferably approximately ½" in length and the standard threaded section 57 is preferably approximately ¾" in length.

Preferably, the horizontal threaded section 58 has a larger diameter than the standard threaded section 57 so that the horizontal threaded section 58 is able to contact the outer tubular casing 20 without interference from the standard threaded section 57. Optionally, other methods of holding the handle mechanism 40 to the outer tubular casing 20 and ribbed bar 30 may be provided.

Figure 20:
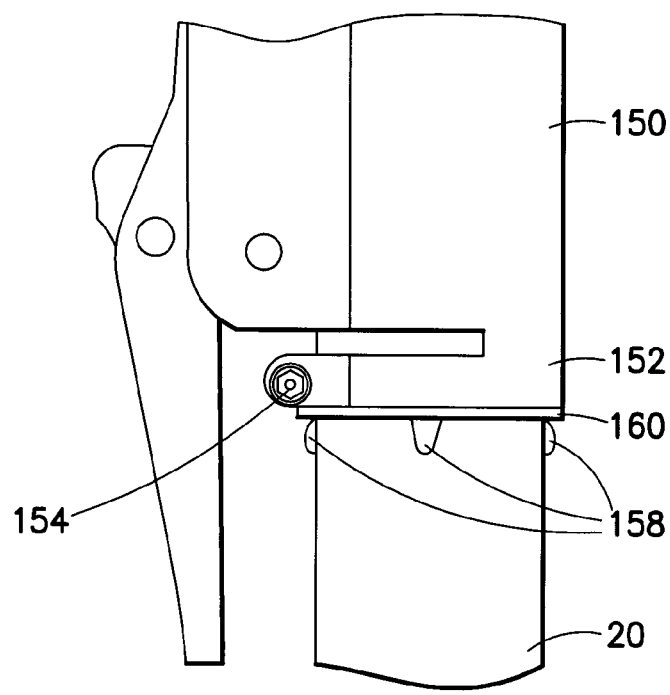
FIG. 20 depicts an alternate apparatus for affixing the handle mechanism to the outer tubular casing.

In an alternative embodiment of a mechanism for securing the handle mechanism to the cargo bar, depicted in FIG. 20, an alternate handle mechanism 150, having an alternate mechanism for attaching the handle mechanism to the outer tubular casing 20 is shown. The alternate handle mechanism 150 has a rearward situated fastening ring 152 which is partially detached from the rest of the handle mechanism 150. When the handle mechanism 150 is disposed around the outer tubular casing 20, a bolt 154 is situated through holes 156 in the fastening ring 152. The bolt 154 tightens the ring 152 thereby grasping the outer tubular casing 20. Preferably, there are several raised edges 158 disposed in a circle around the outer tubular casing 20 several inches from the handle attachment end 24 of the outer tubular casing 20. A thin supporting ring 160 sits on these raised edges 158 to provide support to the alternate handle mechanism 150. The alternate handle mechanism 150 is disposed against the thin supporting ring 160.

As shown in FIGS. 2 and 3, preferably, the lever 42 comprises a top surface 39 and a bottom surface 37, a widened gripping portion 43, a narrow locking portion 45, and a tooth end 47. Preferably, the widened gripping portion 43 is approximately 3.25" in length and 1.125" in width, and has a curved end. The narrow locking portion 45 is preferably approximately ¾" in width, allowing it to fit into the handle components compartment 88, and is approximately 3.25" in length. The locking portion 45 defines a locking slit 49 through which a hook 64 passes, said hook measuring approximately 1 7/16" in length and approximately ¼" in width.

At the tooth end 47 of the handle lever 42 are preferably nine teeth 62, although there can be more or fewer. The teeth 62 serve to grip the ribs 34 of the movable ribbed bar 30, providing a sturdy grip on the ribbed bar 30 while the lever 42 is closed or opened, and also serve to move the ribbed bar 30 inwards and outwards as the lever 42 is brought to a closed or open position. The teeth 62 are arranged in an arc around a rounded portion of the tooth end of the gripping lever 42. This arc arrangement allows the teeth 62 to grip and push or pull the ribs 34 of the movable ribbed bar 30 as the lever 42 is rotated. The teeth 62 are preferably wedge shaped and approximately ⅛" in height, approximately ⅛" in width, and spaced apart from each other by approximately ⅛".

Figure 15:
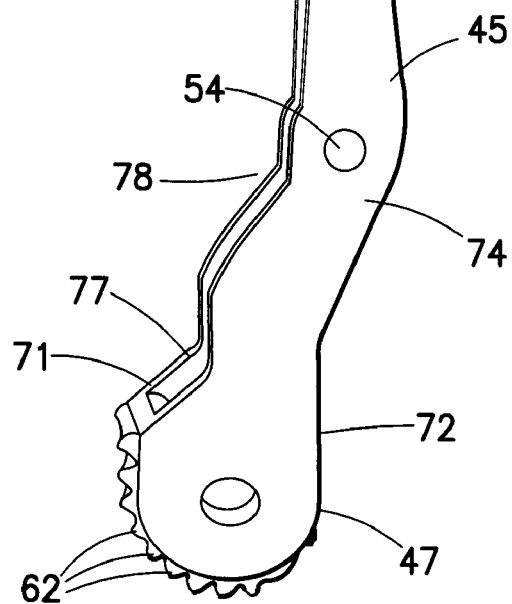
FIG. 15 is a side view of a lever handle.
Figure 16:
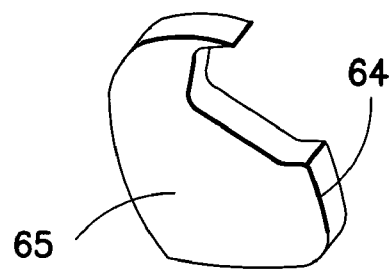
FIG. 16 shows a first preferred embodiment of a hook for locking a lever handle to a handle mechanism.
Figure 17:
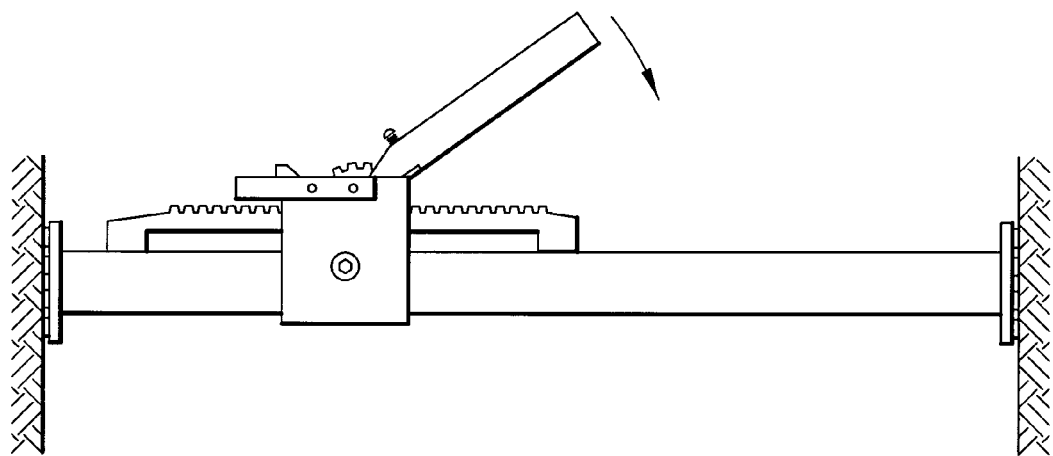
FIG. 17 depicts a first prior art cargo bar device, described in U.S. Pat. No. 5,833,414 to Feldman.
Figure 18:
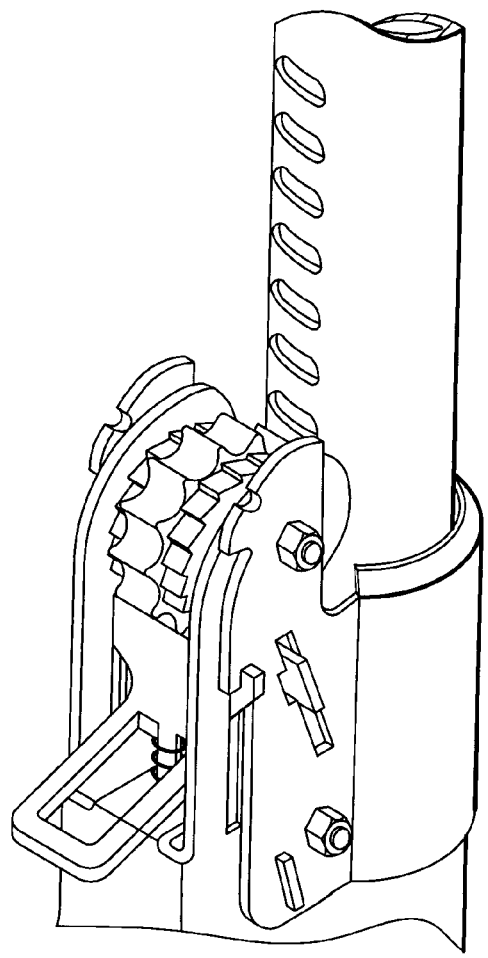
FIG. 18 depicts a second prior art device, described in U.S. Pat. No. 5,947,666 to Huang.
Figure 19:
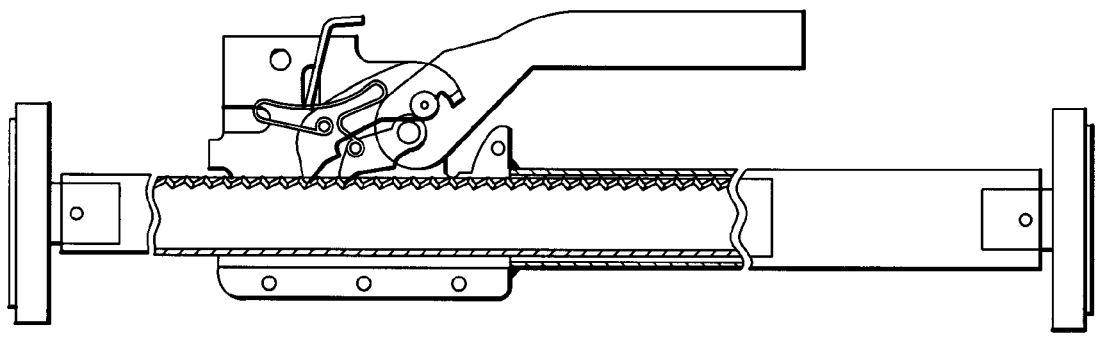
FIG. 19 depicts a third prior art device, described in U.S. Patent Application Publication Number 2008/0210915 to Ruan.

Referring to FIG. 15, a side view of the lever is now shown and described. The side of the gripping lever 42 forms a jagged shape along its length as follows. The top surface of the tooth portion 47 is a level surface 72. It is adjacent to an angled surface 74 which angles upwards. This angled surface 74 is adjacent to a final level surface 76. On the bottom surface of the tooth portion 47, adjacent to the teeth 62, is an angled surface 71. Adjacent this angled surface 71 is a small level surface 73, which is adjacent to another angled surface 75, which is finally adjacent to a large level surface 77. This shape creates two nooks at the bottom of the lever 42, a hook axle nook 78, and a handle mechanism securing bolt nook 79, and these nooks provides space such that the lever 42 does not bump into the hook axle 66 or the handle mechanism securing bolt 46.

Referring to FIGS. 2-4 and 16, the shape of the hook will now be described in more detail. The hook is has a width of approximately 3/16". It has a flat bottom surface, and two sidewalls extending perpendicular and upwards from the flat bottom surface. One sidewall is at the hook's open end while the other sidewall is opposite that end. From the open-end sidewall, the surface angles inwards and curves around to form the hook's interior edge. An outer curve begins at the point of the hook surface and curves around the top of the hook body to join with the open-end sidewall. Preferably the inner space of the hook is large enough to allow an approximately 3/16" securing rod to fit into that space.

The connection between the hook 64 and the handle mechanism 40 will now be described. In a first preferred embodiment, a hook axle 66 is affixed to the two side-walls 86 of the handle mechanism 40. The diameter of the hook axle 66 is preferably approximately 5/16". The body of the spring-loaded locking hook 64 preferably defines a cylindrical hole through which the spring axle 66 passes, thus securing the hook 64 within the lever components compartment 88. Preferably a hook spring 68 is wrapped around the spring axle 66 and the end of the spring 68 is pressed against the back of the hook 64. The hook 64 preferably points upwards and the open end of the hook 64 points towards the outer tubular casing end 82 of the handle mechanism 40. The hook 64 has a large bottom section 65 which contacts the surface of the enveloping portion 80 of the handle mechanism 40 to provide a stop for the hook's 64 rotation. The hook 64 can therefore rotate between a locked position and an opened position, with the hook spring 68 acting to bias the hook 64 towards the locked position. The height of the hook 64, from its large bottom section to the top of its hook 64 is preferably approximately 1.25".

The hook 64 assists with locking the lever 42 into a closed position. When the lever 42 is brought into a closed position, the hook 64 passes through a slit 49 in the lever 42. After passing through, the hook spring 68 forces the hook 64 to clasp over a retention bar 54 traversing the slit 49 and affixed to the lever 42, thereby locking the lever 42 in a closed position. To release the lever, the hook 64 may be flicked away from the retention bar 54, so that the lever 42 is disengaged from the hook 64. Other methods of locking and unlocking the lever 42 are possible.

Figure 5:
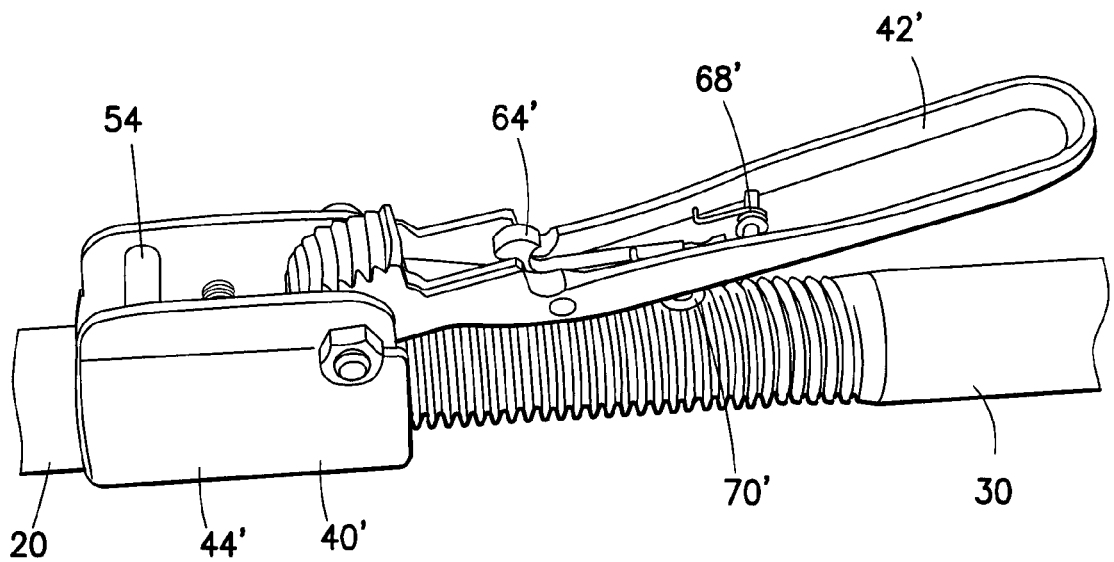
FIG. 5 is a close-up view of a second embodiment of a cargo bar handle in an open position.
Figure 6:
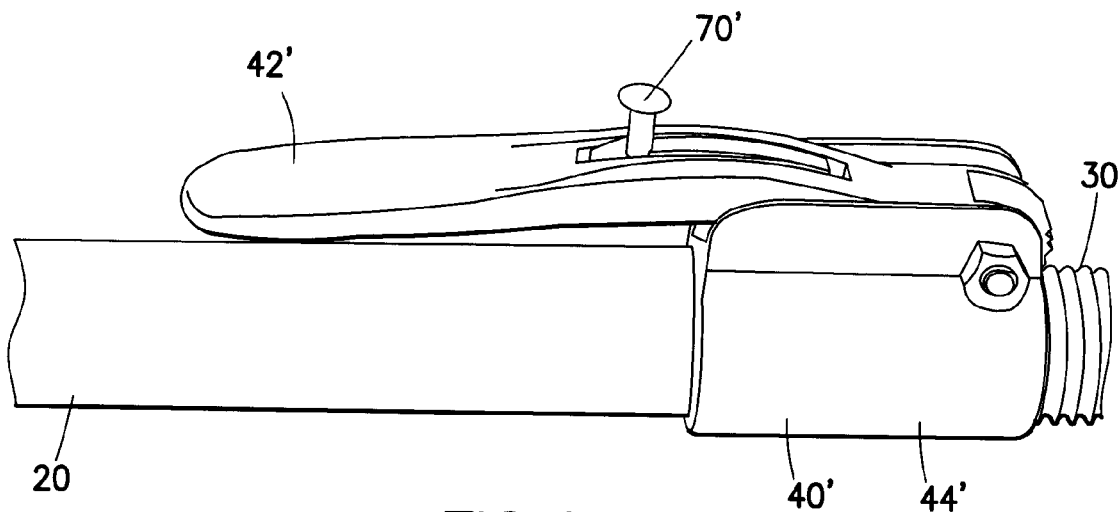
FIG. 6 is a close-up view of a second embodiment of a cargo bar handle in a closed position.

In one alternative embodiment of a hook locking mechanism, shown in FIGS. 5 and 6, a hook 64' is rotatably affixed to the handle lever 42'. When the lever 42' is brought towards the handle frame 44', the hook 64' engages a retention bar 54' which is transversely affixed to the handle frame 44'. A hook spring 68' in the lever 42' biases the hook 64' towards a locked position. A release button 70' extends outwards from the top of the lever 42', and allows for release of the hook 64' and disengagement from the handle frame 44'. To release the lever 42' from a locked position, the button 70' is simply pressed into the handle frame 44'. This rotates the spring biased hook 64' such that it disengages from the retention bar 54'. Optionally, a protective cover may be included over the button 70' to protect against accidental release of the bar 10.

Figure 8A:
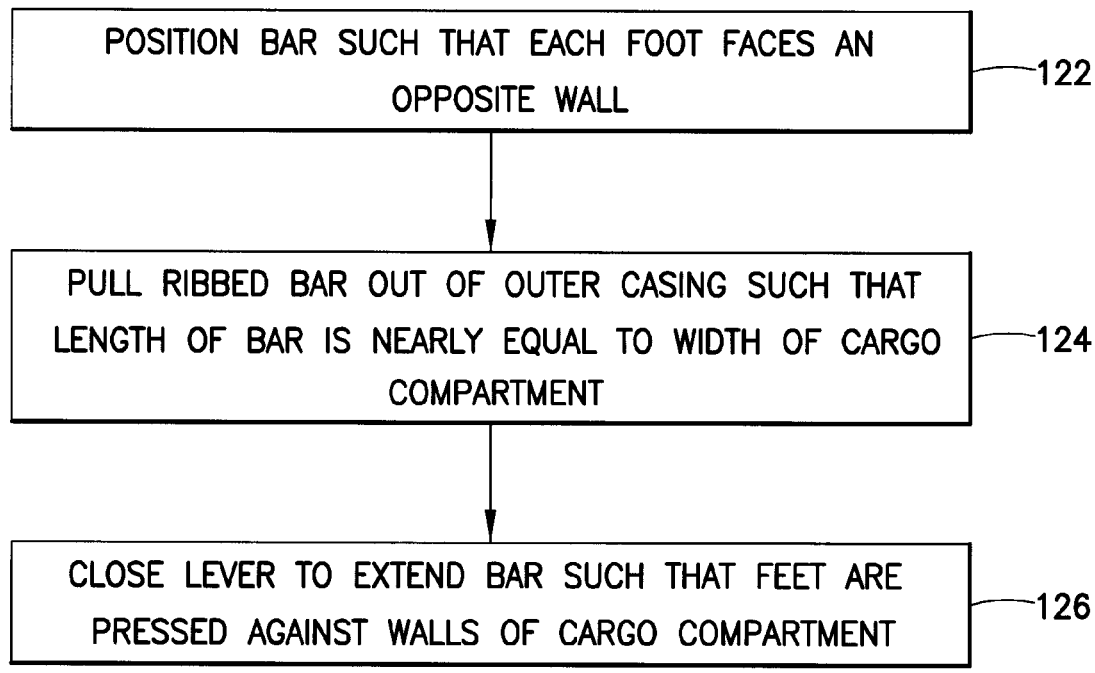
FIG. 8A-B are flow charts depicting methods of installing and removing the cargo bar.
Figure 11:
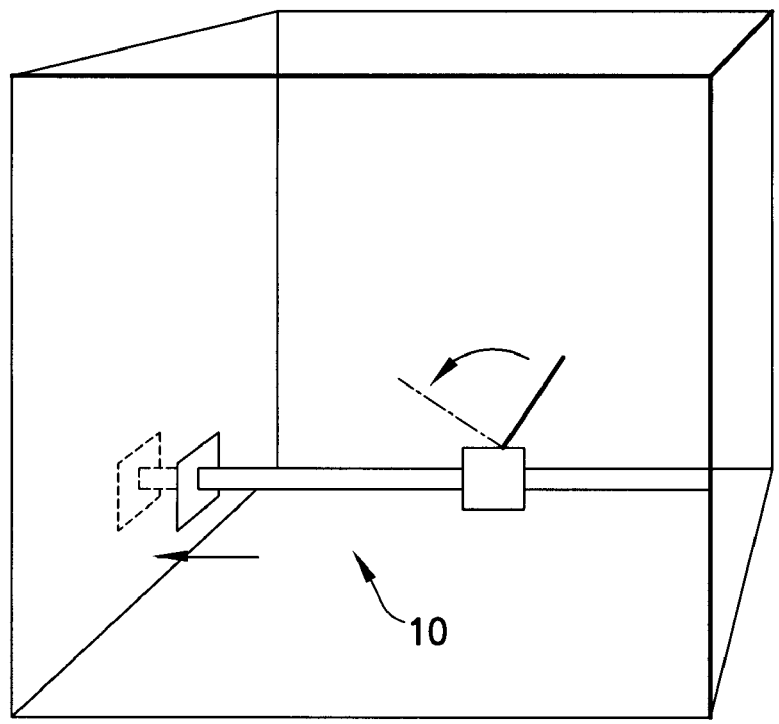
FIG. 11 shows a cargo bar being installed into a cargo compartment.

Referring to FIGS. 8A and 11, a method of operating the Cargo Bar 10 will now be described. The cargo bar 10 may be used to secure cargo in a vehicle such as a truck. To accomplish this, in step 122, the bar 10 is positioned such that each of its feet 90 face an opposite wall of a cargo compartment. In step 124, the ribbed bar 30 is pulled out of the outer casing 20 such that the length of the bar 10 is nearly equal to the width of the cargo compartment. In step 126, the lever 42 is closed, thereby extending the bar 30 such that the feet 90 are pressed against the walls of the cargo compartment. The gripping features 96 at the end of the feet 90 provide gripping force against the walls of the cargo compartment. In this fixed position, the bar serves to hold cargo in place during vehicle transport.

Figure 8B:
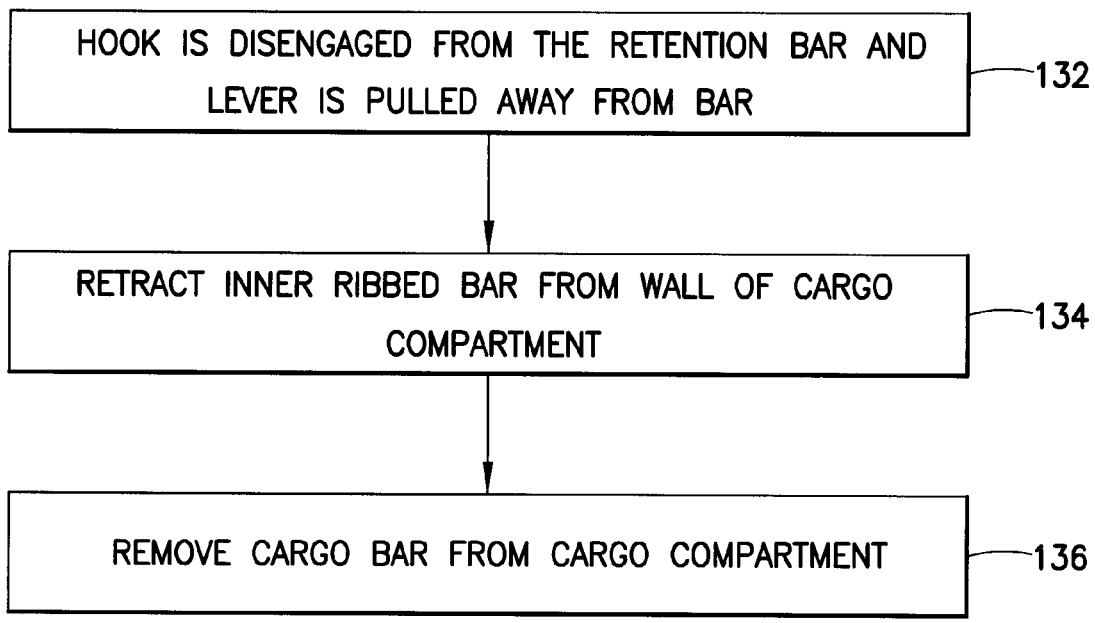
Figure 12:
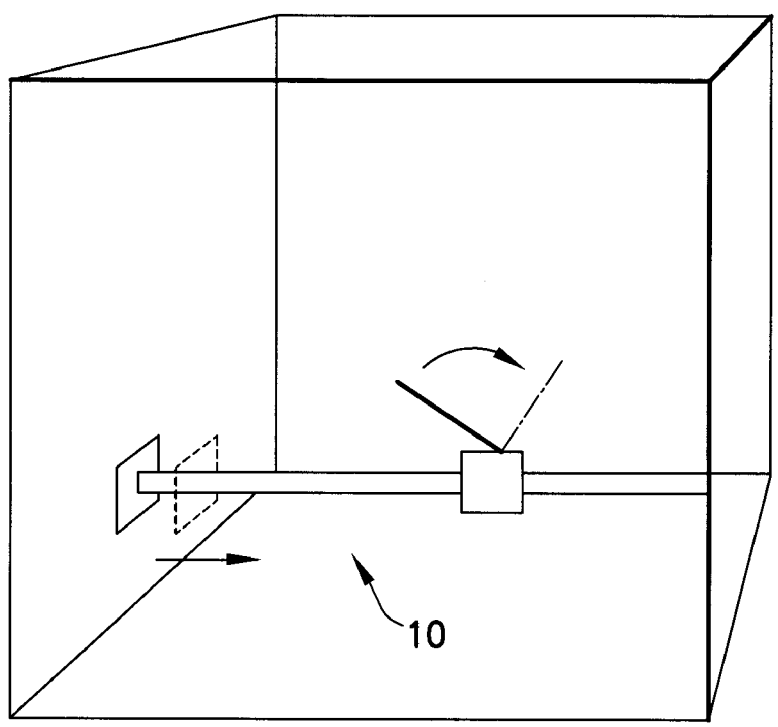
FIG. 12 shows a cargo bar being removed from a cargo compartment.

As shown in FIGS. 8B and 12, release of the bar 10 is now described. To remove the bar 10, the lever 42 must be moved from the closed position to the open position. As the lever 42 is locked in the closed position, it must be unlocked before it is moved. Therefore, in step 132, the hook 64 is disengaged from the retention bar 54 and the lever 42 is pulled away from the bar 10. To disengage the hook 64 in the first embodiment, the hook 64 is flicked away from the retention bar 54 in the lever 42. To disengage the hook 64 in the second embodiment, the protruding hook release button 70' is pressed. In step 134, pulling the lever 42 away from the bar 10 activates the teeth 62 of the lever 42 which pull the ribbed bar 30 into the outer tubular casing 20. In step 136, the inner ribbed bar 30 can then be retracted from the wall and the cargo bar 10 may be removed entirely from the cargo area if desired.

Although the invention has been described with reference to preferred embodiments, it will be appreciated by one of ordinary skill in the art that numerous configurations and modifications are possible in light of the above disclosure. For example, the bar may be made out of various different materials. Further, the lengths of the bar can be made to accommodate any location in which it is installed. Additionally, various different attachment methods may be used to attach the bar to feet, or to attach various parts to the bar. All such variations and modifications are intended to be within the scope of the invention.

We claim:

1. An extendable cargo bar for securing cargo, comprising:
   an outer tubular casing having a handle end and a foot end;
   an inner ribbed bar disposed within said outer tubular casing, said inner ribbed bar having a handle end and a foot end, the cylindrical wall of the inner ribbed bar having spaced rolled annular ribs; and
   a handle mechanism coupled to the outer tubular casing, said handle mechanism having a lever for operating the bar, the lever being rotatable between a locked and an unlocked position, the lever having an arc-shaped teeth section having teeth for engaging with the ribs of the inner ribbed bar;
   said lever being positioned such that the teeth section is adjacent to the inner ribbed bar, the teeth of the lever being engageable with the ribs of the inner ribbed bar such that the lever is able to force the inner bar outwards upon rotating of the lever to a locked position, and inwards upon rotating of the lever to an unlocked position.

2. The extendable cargo bar of claim 1, wherein:
   the foot ends of the outer tubular casing and the inner ribbed bar define foot attachment holes extending radially through the outer tubular casing and the inner ribbed bar.

3. The extendable cargo bar of claim 2, further comprising:
   one or more feet attached to the foot end of the outer tubular casing and the inner ribbed bar, for gripping cargo transportation walls.

4. The extendable cargo bar of claim 1, wherein:
   the handle mechanism further comprises a handle frame having a hollow enveloping portion for enveloping the outer tubular casing.

5. The extendable cargo bar of claim 4, the handle mechanism further comprising:
   a handle mechanism attachment bolt having horizontal threads for coupling the handle mechanism to the outer tubular casing, the attachment bolt being disposed through holes defined by the handle mechanism;
wherein the horizontal threads of the handle mechanism attachment bolt are tightened against the handle end of the outer tubular casing, thereby coupling the handle mechanism to the outer tubular casing.

6. The extendable cargo bar of claim 4, wherein:
the handle mechanism has a spring-loaded hook and a hook retention bar for retaining the lever in a said locked position, the spring-loaded hook being positioned to clasp around the hook retention bar upon closure of the lever.

7. The extendable cargo bar of claim 6, wherein:
the spring-loaded hook is connected to a hook axle, which is disposed through bolt holes in the handle frame; and
the hook retention bar is disposed in the handle lever in a position which corresponds to the hook when the lever is in a closed position.

8. The extendable cargo bar of claim 6, wherein:
the spring-loaded hook is connected to a hook axle disposed through bolt holes in the lever; and
the hook retention bar is disposed through bolt holes in the handle frame at a position which corresponds to the hook when the lever is in a closed position.

9. The extendable cargo bar of claim 1, further comprising:
one or more foot extensions attached to the foot end of either the outer tubular casing or the inner ribbed bar.

10. The extendable cargo bar of claim 1, wherein the length of the bar is between approximately 80 inches and 110 inches.

11. The extendable cargo bar of claim 1, wherein the foot extension comprises:
an attachment shaft having one or more depressible prongs; and
a foot coupled to the attachment shaft.

12. An extendable cargo bar for securing cargo, comprising:
an outer tubular casing having a handle end and a foot end, the foot end of the outer tubular casing defining holes extending radially through the casing;
an inner ribbed bar, having a handle end and a foot end, the cylindrical wall of the inner ribbed bar having spaced rolled annular ribs, the foot end of the inner ribbed bar defining holes extending radially through the bar;
a handle mechanism coupled to the outer tubular casing, the handle mechanism having a lever for operating the bar and a handle frame having a hollow enveloping portion for enveloping the outer tubular casing, the lever being rotatable between a locked and an unlocked position, the lever having an arc-shaped teeth section having teeth for engaging with the ribs of the inner ribbed bar, said lever being positioned such that the teeth section is adjacent to the inner ribbed bar, the teeth of the lever being engageable with the ribs of the inner ribbed bar such that the lever is able to force the inner bar outwards upon rotating of the lever to a locked position, and inwards upon rotating of the lever to an unlocked position;
a handle mechanism attachment bolt having horizontal threads for coupling the handle mechanism to the outer tubular casing, the attachment bolt being disposed through holes defined by the handle mechanism, the horizontal threads of the handle mechanism attachment bolt being tightened against the handle end of the outer tubular casing, thereby coupling the handle mechanism to the outer tubular casing; and
one or more feet attached to the foot end of the outer tubular casing or the inner ribbed bar, for gripping cargo transportation walls.

13. The extendable cargo bar of claim 12, wherein:
the feet have a gripping side and an attachment side; and
an attachment extension extends from the attachment side.

14. The extendable cargo bar of claim 13, wherein:
the gripping side of the feet has a matrix of square projections for providing gripping strength.

15. The extendable cargo bar of claim 12, wherein:
the lever has a gripping end and a tooth end, wherein the teeth of the lever are formed out of walls of the tooth end.

16. The extendable cargo bar of claim 15, wherein:
the lever defines a slit, and a retention bar for retaining a spring-loaded hook is disposed through the slit.

17. A method of securing cargo using a Cargo Bar, comprising:
providing a cargo bar comprising: an outer tubular casing having a handle end and a foot end, an inner ribbed bar disposed within said outer tubular casing, said inner ribbed bar having a handle end and a foot end, the cylindrical wall of the inner ribbed bar having spaced rolled annular ribs, and a handle mechanism coupled to the outer tubular casing, said handle mechanism having a lever for operating the bar, the lever being rotatable between a locked and an unlocked position, the lever having an arc-shaped teeth section having teeth for engaging with the ribs of the inner ribbed bar, said lever being positioned such that the teeth section is adjacent to the inner ribbed bar, the teeth of the lever being engageable with the ribs of the inner ribbed bar such that the lever is able to force the inner bar outwards upon rotating of the lever to a locked position, and inwards upon rotating of the lever to an unlocked position;
placing the cargo bar between two support surfaces; and
extending the cargo bar by closing the lever such that the feet grip the support surfaces.

18. The method of claim 17, wherein:
the cargo bar further comprises a spring-loaded hook and a retention bar for retaining the lever in a locked position;
extending the cargo bar by closing the lever further comprises closing the bar until the hook engages the retention bar.

19. The method of claim 17, wherein:
the cargo bar further comprises at least one foot extension coupled to at least one of the handle end and the foot end; and
extending the cargo bar further comprises adjusting the at least one foot extension to an appropriate length.

* * * * *